(12) United States Patent
Bank et al.

(10) Patent No.: US 9,998,548 B2
(45) Date of Patent: Jun. 12, 2018

(54) TRANSITION FROM A PRIMARY COMMUNICATION SESSION TYPE TO A SECONDARY COMMUNICATION SESSION TYPE

(71) Applicant: INTERNATIONAL BUSINESS MACHINES CORPORATION, Armonk, NY (US)

(72) Inventors: Judith H. Bank, Cary, NC (US); Liam Harpur, Dublin (IE); Ruthie D. Lyle, Durham, NC (US); Patrick J. O'Sullivan, Dublin (IE); Lin Sun, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 718 days.

(21) Appl. No.: 14/571,593

(22) Filed: Dec. 16, 2014

(65) Prior Publication Data
US 2016/0173616 A1 Jun. 16, 2016

(51) Int. Cl.
*H04L 29/08* (2006.01)
*G06F 15/16* (2006.01)
*H04L 12/58* (2006.01)

(52) U.S. Cl.
CPC ............ *H04L 67/148* (2013.01); *H04L 51/22* (2013.01); *H04L 51/32* (2013.01)

(58) Field of Classification Search
CPC ..... H04L 51/046; H04L 51/06; H04L 51/066; H04L 45/22; H04L 45/24; H04L 65/1066;
(Continued)

(56) References Cited

U.S. PATENT DOCUMENTS 7,171,190 B2 * 1/2007 Ye ..................... G06Q 10/107
379/88.04
7,509,382 B1 3/2009 Jania et al.
(Continued)

OTHER PUBLICATIONS

Anonymous, "Method for Automatic Content Integration from Direct Communication Methods like Email and Instant Messaging to Modern Social Enterprise Systems", IP.com, IPCOM000229280D, Jul. 18, 2013, pp. 1-4.
(Continued)

*Primary Examiner* — Madhu Woolcock
(74) *Attorney, Agent, or Firm* — Law Office of Jim Boice (57) ABSTRACT

Communications from a primary communication session are transitioned to a secondary communication session. A primary communication from a primary communication session is detected, where the primary communication is between a first device and a second device, and where the primary communication session is a first type of communication session. A signal selecting a secondary communication session for future communications from the first device is received, where the secondary communication session is a second type of communication session that is different from the first type of communication session, and where the secondary communication session has been determined to be a preferable venue for the future communications from the first device. Future communications from the first device are then directed to the secondary communication session.

13 Claims, 3 Drawing Sheets

(58) Field of Classification Search
CPC . H04L 65/1086; H04L 65/4007; H04L 67/14; H04L 67/148; H04L 51/22; H04L 51/32
USPC ........ 709/206, 227–229, 238, 239, 242, 230
See application file for complete search history.

(56) References Cited

U.S. PATENT DOCUMENTS

| | | | |
|---|---|---|---|
| 8,224,915 B2* | 7/2012 | Malik | H04L 51/04 709/204 |
| 8,676,913 B1 | 3/2014 | Roche et al. | |
| 2002/0016163 A1* | 2/2002 | Burgan | H04L 12/1827 455/412.2 |
| 2005/0251555 A1* | 11/2005 | Little, II | H04L 51/043 709/206 |
| 2006/0031331 A1* | 2/2006 | LoBuono | H04L 51/04 709/206 |
| 2006/0168026 A1* | 7/2006 | Keohane | H04L 51/04 709/206 |
| 2007/0124405 A1* | 5/2007 | Ulmer | G06Q 10/107 709/207 |
| 2008/0115068 A1* | 5/2008 | Smith | H04L 12/1813 715/758 |
| 2009/0157819 A1 | 6/2009 | Hampton | |
| 2009/0187831 A1* | 7/2009 | Tiwana | G06Q 10/107 715/752 |
| 2010/0312836 A1* | 12/2010 | Serr | G06Q 10/00 709/206 |
| 2016/0035343 A1* | 2/2016 | Tang | G10L 13/00 704/260 |

OTHER PUBLICATIONS

IBM, "Method to Manage Email Threads through Relocation to a Discussion Forum and Elimination of Continued Email Delivery", IPCOM000178279D, IP.com, Jan. 21, 2009, pp. 1-3.

* cited by examiner

TRANSITION FROM A PRIMARY COMMUNICATION SESSION TYPE TO A SECONDARY COMMUNICATION SESSION TYPE

BACKGROUND

The present disclosure relates to the field of electronic communications between devices, and specifically to electronic communication sessions between devices. Still more particularly, the present disclosure relates to establishing a secondary electronic communication session based on a type of a primary electronic communication session between devices.

SUMMARY

In an embodiment of the present invention, a system includes a first communication device and a second communication device, where a primary communication session is established by a primary communication between the first communication device and the second communication device. A communication monitoring device monitors the first communication device and the second communication device. The communication monitoring device: detects the primary communication from the primary communication session, where the primary communication session is of a first type of communication session; receives a signal selecting a secondary communication session for future communications from the first device, where the secondary communication session is of a second type of communication session that is different from the first type of communication session, and where the secondary communication session has been determined to be a preferable venue for the future communications from the first device; and directs the future communications from the first device to the secondary communication session.

In an embodiment of the present invention, a method and/or computer program product transitions communications from a primary communication session to a secondary communication session. A primary communication from a primary communication session is detected, where the primary communication is between a first device and a second device, and where the primary communication session is a first type of communication session. A signal selecting a secondary communication session for future communications from the first device is received, where the secondary communication session is a second type of communication session that is different from the first type of communication session, and where the secondary communication session has been determined to be a preferable venue for the future communications from the first device. Future communications from the first device are then directed to the secondary communication session.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 1:
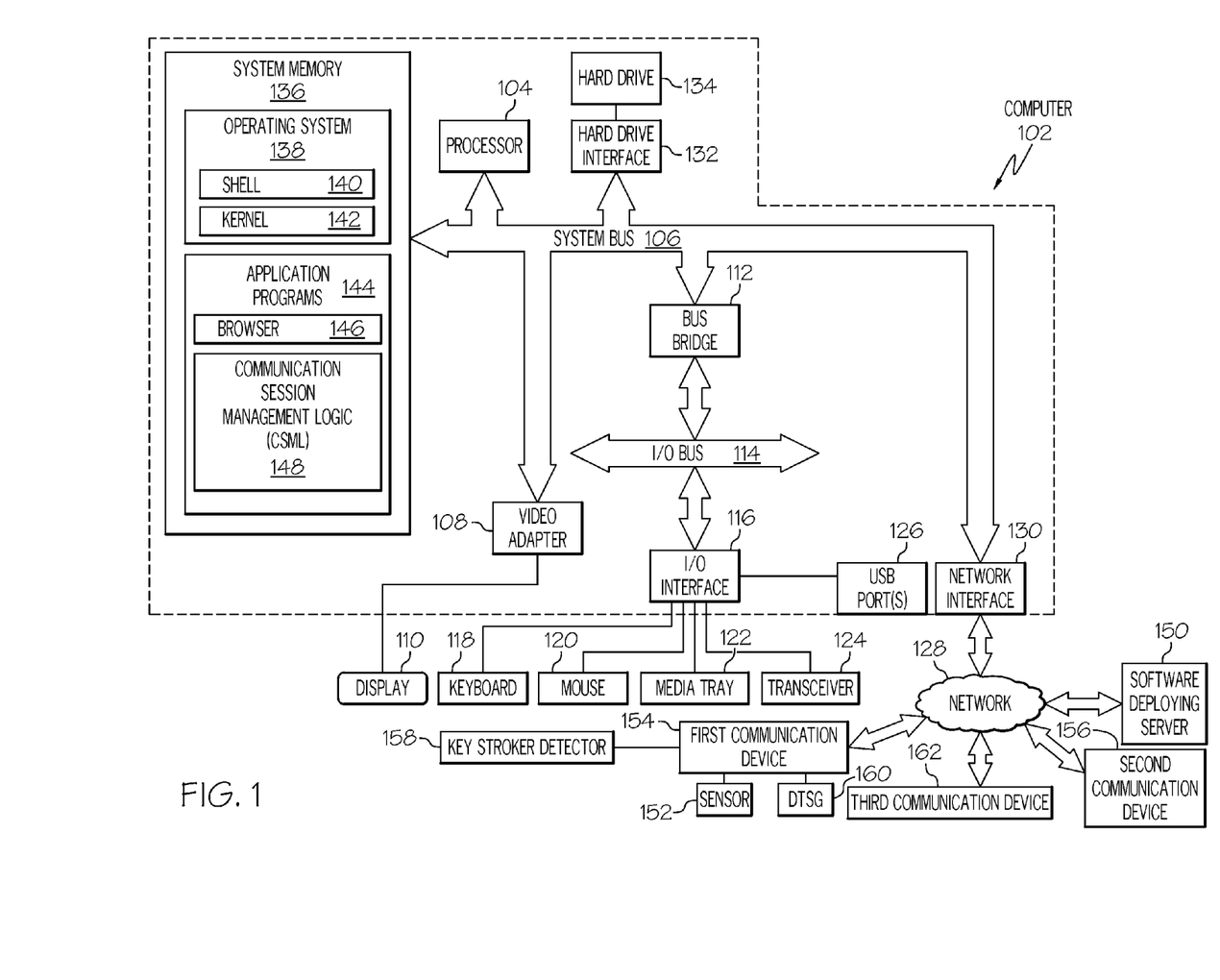
FIG. 1 depicts an exemplary system and network in which the present disclosure may be implemented.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or the first communication device 154 and/or the second communication device 156 depicted in FIG. 1.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a transceiver 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a Communication Session Management Logic (CSML) 148. CSML 148 includes code for implementing the processes described below, including those described in FIGS. 2-3. In one embodiment, computer 102 is able to download CSML 148 from software deploying server 150, including in an on-demand basis, wherein the code in CSML 148 is not downloaded until needed for execution. Note further that, in one embodiment of the present invention, software deploying server 150 performs all of the functions associated with the present invention (including execution of CSML 148), thus freeing computer 102 from having to use its own internal computing resources to execute CSML 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
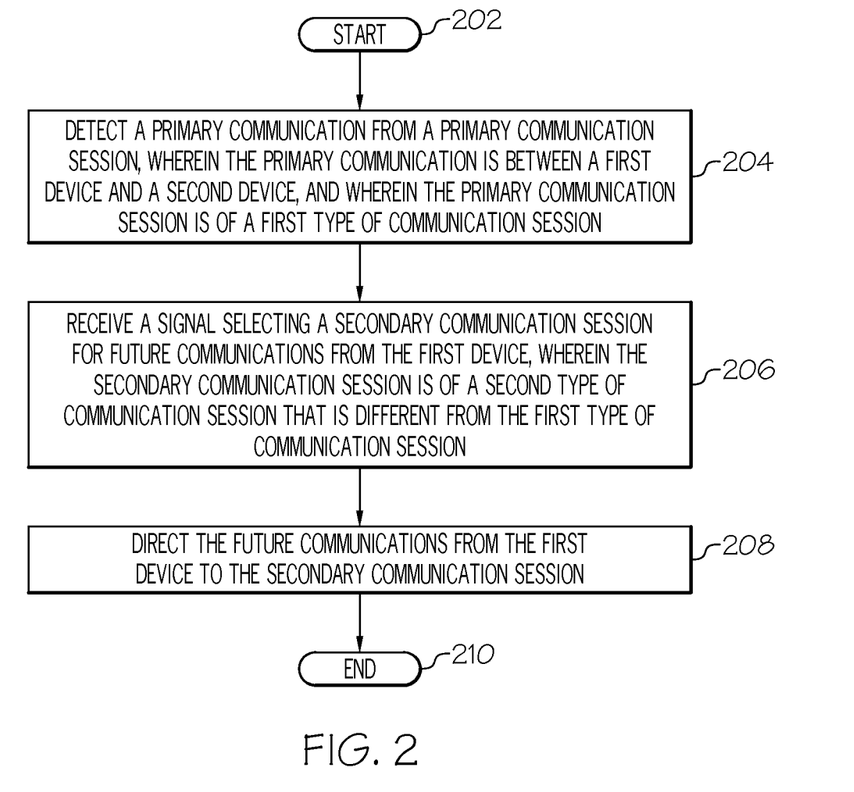
FIG. 2 is a high level flow-chart of one or more operations performed by one or more hardware devices to establish a secondary communication session between two devices.

With reference now to FIG. 2, a high level flow-chart of one or more operations performed by one or more hardware devices to transition from a primary communication session to a secondary communication session between two devices is presented. After initiator block 202, a communication monitoring device detects a primary communication from a primary communication session, where the primary communication is between a first communication device and a second communication device, and where the primary communication session is a first type of communication session (block 204). For example, computer 102 in FIG. 1, acting as a communication monitoring device, detects that a first communication device 154 and a second communication device 156 are engaged in a primary communication session. In various embodiments of the present invention, first communication device 154 and second communication device 156 are any two devices that are able to electronically communicate, such as computers, telephones, radios, etc. This communication may be direct (e.g., via e-mail, text messages, etc.), or indirect (e.g., via postings on a community chat room, a blog site, etc.).

As depicted in block 206 in FIG. 2, the communication monitoring device receives a signal selecting a secondary communication session for future communications from the first communication device, where the secondary communication session is a second type of communication session that is different from the first type of communication session, and where the secondary communication session has been determined to be a preferable venue for the future communications from the first device.

For example, the primary communication from the first communication device may be an e-mail exchange. However, the second communication device, which receives e-mail from the first communication device as well as other communication devices, may be inundated with e-mails about a same subject. As such, the user of the second communication device is unable to properly tend to such e-mails. The present invention will automatically transfer any future e-mails to a secondary communication session, such as a forum room, a chat room, a blog wall, etc., or perhaps a special e-mail address that receives e-mails related only to this same subject. Thus, any future e-mails regarding this subject are sent to a specialized destination, thus freeing up the inbox for the user of the second communication device.

In one embodiment, the selection of the secondary communication session (i.e., what type of communication session should be handling communications related to a particular subject), can be made manually. For example, a user can "right click" on a subject line of an e-mail. As shown in the e-mail user interface 302 in FIG. 3, assume that User A receives an e-mail from Sender B, related to Topic X (from the "Subject" line), as shown in window 304. By right clicking on the subject line, a set of options for a secondary communication format/session is presented to User A in a pop-up window 306. These options include a particular chat room, blog wall, phone system, e-mail folder, etc. that is appropriate (e.g., has been created and/or reserved for Topic X) for future communications from Sender B as well as other senders related to Topic X.

Figure 3:
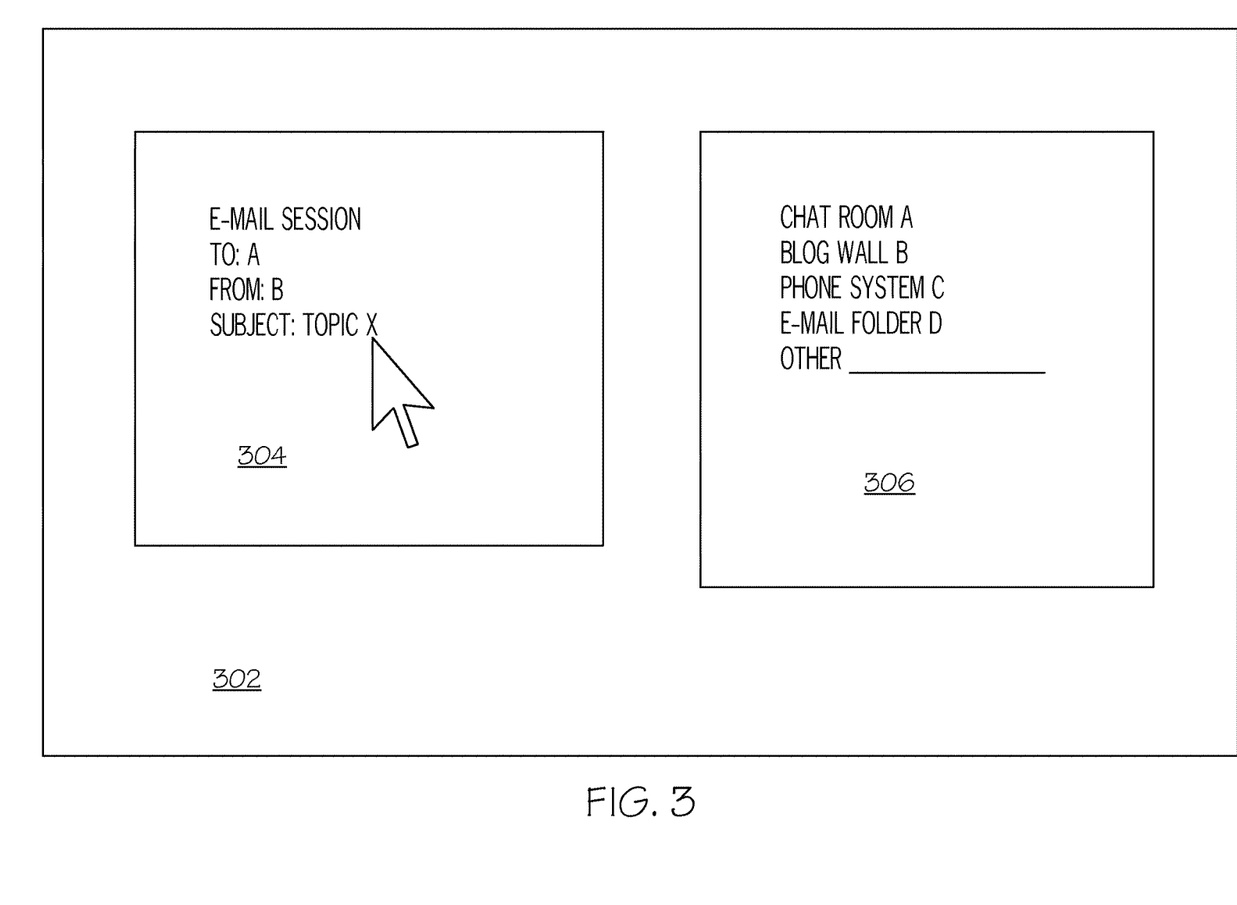
FIG. 3 illustrates an exemplary user interface used in one or more embodiments of the present invention.

Selecting one of the options from pop-up window 306 causes any future e-mails, from Sender B and/or other senders, related to Topic X to be automatically redirected to the selected alternate communication session selected from pop-up window 306. For example, if Sender B subsequently sends an e-mail related to Topic X (as determined by the contents of the subject line in the e-mail or by data mining the content of the e-mail message body), rather than simply putting this subsequent e-mail in the general inbox of User A's e-mail application, this subsequent e-mail is redirected to a particular folder of User A's e-mail application, or it populates a thread of comments in a chat room, or it is converted into a voice message for a phone system, etc.

Returning to FIG. 2, once the secondary communication session is selected/established, the communication monitoring device redirects any future communications from the first communication device away from the primary communication session (e.g., an e-mail session) to the secondary communication session (e.g., a chat room), as described in block 208.

The flow chart of FIG. 2 ends at terminator block 210.

Note that the present invention is not limited to redirecting e-mails to alternate types of communication venues. For example, the primary communication session may be a voice communication, a video teleconference, an instant messaging session, a text session, etc. Likewise, the secondary communication session may be for a chat room, a particular folder, a video teleconference, etc. That is, in one or more embodiments of the present invention, the primary communication session is any type of communication session that has been deemed inappropriate (due to overwhelming traffic, security issues, confidentiality issues, etc.) for a particular sender/receiver/topic, and the secondary communication session is any type of communication session that has been deemed appropriate (e.g., meets confidentiality constraints, security constraints, recipient types, etc.) for that particular sender/receiver/topic.

The session type identifier may be gleaned from text in the primary communication, the types of devices involved in the primary communication, the physical condition (e.g., location, temperature, etc.) of the devices involved in the primary communication, etc.

Thus, the invention provides a contextual cue in collaborative applications which, in one or more embodiments, is silent/invisible and can be triggered by a signal (e.g., a right-click) from the user. In one embodiment, this signal brings up an appropriate menu of choices for the secondary communication session (discussed herein).

The following examples describe three exemplary implementations/embodiments of the present invention.

EXAMPLE 1

An e-mail contains text that indicates a customer problem (e.g., a "critical situation" or "crit-sit"). The e-mail may motivate an activity (e.g., establishing a new communication session via a different architecture such as an instant messaging session or a phone call) that is spawned to mature the crit-sit to closure. In an embodiment, the user right-clicks within the e-mail body to trigger "Create->Activity", from which the title of the activity will be primed in a child user interface within the triggered application (e.g., the instant messaging program or other application/user interface). This allows the user to capture the key fields to trigger an activity creation, and also allows the user to identify/add the activity members, such that the instant messaging program is automatically seeded with the members of the e-mail from the "To", "CC", "BCC" and "From" fields.

In one or more embodiments, the instant messaging program (or other application/user interface) is primed with the subject/topic as well as relevant activity context (from the e-mail body field), using intelligent summarization if the body field is too long. That is, if the right click captures a lengthy passage from the e-mail, the system can condense this passage into a subject topic using predefined key words from the captured passage.

Likewise the user is able to adjust the newly created application/form/UI (e.g. change the title, change the member list, add to the member list, change the subject, etc.) in the newly created application/form/UI. Once the user presses "Accept" in the new application, subsequent steps occur for creating the activity, adding the members, adjusting relevant access control lists (ACLs) of persons who can access the newly created application/form/UI, priming the activity with the relevant seeded text, and notifying the activity members. Likewise, if the new application uses a webpage or other web resource, then the universal resource identifier is presented (e.g., via e-mail) to the activity members who will be using the new application.

EXAMPLE 2

Assume that posting to a real time communication (RTC), such as an enhancement request from a customer, motivates the creation of a community (e.g., a chat room, a blog, a "friends" group on a social media website, etc.). This enhancement request can be expanded, discussed, designed, etc. In one or more embodiments of the present invention, a user can right-click within the RTC and trigger a "Create->Community" message, from which the title of the community will be primed in a child UI within the triggered application (RTC). This allows the user to capture the key fields to trigger the creation of the new community, as well as allow the user to add the community members, such that the UI for the new communication session is automatically seeded with individuals associated with the RTC ticket. Furthermore, the UI is primed with the subject/topic as well as relevant community context (from the RTC system) using intelligent summarization if the extracted text is too long.

In one or more embodiments of the present invention, the user is able to adjust this newly created form/UI (e.g. change the title, change the member list, add to the member list, change the subject, etc.) in this UI. Once the user presses "Accept", the subsequent step of creating the community, adding the members, adjusting the relevant ACLs, priming the community with the relevant seeded text, and notifying the community members thereafter is taken care of on their behalf.

EXAMPLE 3

A user may, in a customer relation management (CRM) opportunity, motivate a calendar meeting (i.e., schedule a meeting and placing it on one or more user's electronic calendars) with the opportunity owners (e.g., customers) to discuss mitigation steps in situations where the opportunity is degrading, such that the CRM application is a child UI that is created to allow the user to specify the date/time/attendees of meetings suggested by the CRM, and to interface with the user's preferred calendar system should items or information like "free time" be required. The attendee list is pulled from the CRM opportunity member composition, as is the title and subject for the meeting, and the user's preferred e-mail address and/or dial-in information from their preferred location. Thereafter, upon the user affirming the entries (after changing/adding/modifying the entries if so required), a calendar invite is automatically sent from within the calling application via a child interface, which is motivated by a cue in the calling application.

In an embodiment of the present invention, the secondary communication session is between the communication devices in the first set of communication devices. That is, assume that first communication device 154 and second communication device 156 in FIG. 1 are initially exchanging e-mail messages (the "primary communication session"). Thereafter, based on information gleaned from communications between the first communication device 154 and second communication device 156 during the primary communication session, the first communication device 154 and second communication device 156 may communicate using a different protocol, such as instant messages (the "secondary communication session"). Alternatively, the secondary communication session may be between the first communication device 154 and a third communication device 162, which was not part of the primary communication session.

In an embodiment of the present invention, the session type identifier is a subject matter of the primary communication session. In this embodiment, the communication monitoring device utilizes the subject matter to architect the secondary communication session, where the primary communication session is an e-mail session, and where the secondary communication session is in a community chat room devoted to the subject matter of the primary communication session. For example, assume that the first communication device 154 and second communication device 156 are communicating via e-mail during the primary communication session. The context of the e-mails is derived (using data mining, context analysis, key word searches, etc.) to determine the subject matter of the e-mails. The system then either creates a new chat room (e.g., a private and/or public website in which users are invited to post comments) or identifies an existing chat room that is devoted to the subject matter of the e-mails.

In an embodiment of the present invention, the communication monitoring device determines that a specific device (e.g., the first communication device 154 in FIG. 1) from the primary communication session is already enrolled in an existing community chat room that is directed to the subject matter of the primary communication session. In this scenario/embodiment, the communication monitoring device removes the specific device from the community chat room that was architected for the secondary communication session. That is, assume that the communication monitoring device has set up a new community chat room for one or more participants in the primary communication session. If one or more of these participants are already participating in a chat room that is devoted to the subject matter of the e-mails from the primary communication session, then there is no need to place these participants in a same type of chat room.

In an embodiment of the present invention, the session type identifier is a subject matter of the primary communication session, which may be gleaned from a "subject" title in e-mails, data mining the e-mails, etc. The communication monitoring device utilizes the subject matter to architect the secondary communication session, where the primary communication session is an e-mail session among a first set of participants, and where the secondary communication session is an e-mail session among a second set of participants. For example, assume that the first communication device 154 and the second communication device 156 have been exchanging e-mail messages about a problem with a particular server. Assume further that the first communication device 154 is being used by a user of that particular server, and the second communication device 156 is being used by an owner of that particular server. The system will then create a secondary communication session (e.g., a new e-mail session) between the second communication device 156 and a third communication device 162, which is used by a technician who services that particular server.

In an embodiment of the present invention, the primary communication session is a text-based communication session. A keystroke pattern detection hardware device (e.g., keystroke detector 158 in FIG. 1) detects a keystroke pattern from a device used in the text-based communication session (e.g., first communication device 154). The communication monitoring device, based on the keystroke pattern, assigns the first communication device 154 to a non-text-based communication session. For example, assume that the keystroke detector 158 (which may be a keystroke logging device that has rudimentary logic for detecting temporal distances between keystrokes) determines that a user of the first communication device 154 is a very slow typist. This leads the system to determine that a non-typing session (e.g., a voice session, a session in which pictures are exchanged, etc.) may be easier for that user, and thus engages the first communication device 154 in a system that uses voice transmission, image exchanges (e.g., photo-communication), etc.

In an embodiment of the present invention, the communication monitoring device receives a device type signal that identifies a type of device from the first set of communication devices. The communication monitoring device then utilizes the device type signal to architect the secondary communication session. For example, assume that the device type signal generator (DTSG) 160 receives a universal unique identifier (UUID) from within first communication device 154 (the UUID is not shown in FIG. 1), thus identifying first communication device 154 as a cell phone with a rudimentary (i.e., 10-key) keypad, which is difficult to type on. The DTSG 160 sends this information (either via the network 128 or directly to the transceiver 124 shown in FIG. 1) to the communication monitoring device (e.g., computer 102 in FIG. 1), which recognizes the fact that e-mail communications are not optimal for this type of cell phone, and switches the communications between the first communication device 154 and the second communication device 156 to a more user-friendly format, such as text messages, phone calls, etc.

In an embodiment of the present invention, the communication monitoring device receives a sensor signal from a sensor on a device from the first set of communication devices, where the sensor signal describes a physical condition of the device. The communication monitoring device then utilizes the sensor signal to architect the secondary communication session. For example, assume that sensor 152 in FIG. 1 is a light sensor that is part of a cell phone (first communication device 154). Assume further that ambient light conditions detected by the light sensor are very high (i.e., it is very bright). These bright conditions make it hard to read e-mail or text messages on the cell phone. Therefore, the communication monitoring device (e.g., computer 102) will switch the type of communication session between the first communication device 154 and the second communication device 156 from being text based to audio-based (e.g., a phone call, transmissions of audio recordings, etc.).

In an embodiment of the present invention, the sensor 152 is a positioning sensor, which determines a physical location of the first communication device 154. For example, assume that a global positioning system (GPS) device (not depicted) within sensor 152 determines that the first communication device 154 is within a facility where text messaging is prohibited. Based on this information from the GPS device, and access to a rule database (also not shown) that matches this facility with the rule prohibiting text messaging, the system will generate a secondary communication session that uses an allowed protocol (e.g., e-mail).

As described herein, the present invention overcomes many limitations found in the prior art. For example, a barrier to social computing and collaboration with customers is that many persons traditionally work/communicate using e-mail. While such users may have access to alternative communications systems (e.g., postings on social media websites, texting, instant messaging, etc.), the prior art does not provide for a smooth transition from e-mail to such alternative communication systems. The present invention accomplishes this smooth transition.

For example, User A answering User B's question in email certainly helps User B. It does not help Users D,E,F . . . , who may have User B's question at a later date. The present invention traps this knowledge in an email context, and then invokes a social media context. In one embodiment, analytics of the original e-mails infer whether the e-mails were a question and answer (Q&A). If so, then future communications are moved to a Q&A forum, such as a chat room. Analytics also extrapolate the likely social medium to send communications to, based on the nature of both the audience (persons in the initial communication session) and the content discerned.

In one or more embodiments of the present invention, multiple location types are recommended for use in the secondary communication session.

Furthermore, traditional communities, team spaces and other collaboration spaces are usually "heavy", in that they take a long time to create and manage and are usually significant in size. One or more embodiments of the present invention avoid this overloading of systems by creating small communities (e.g., secondary communication sessions such as chat rooms) that have a limited lifetime. As described herein, creation and termination of such "mini" communities, based on duplicated subject matters of the different "mini" communities, is achieved by the present invention.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method of transitioning from a primary communication session to a secondary communication session, the method comprising:
   detecting, by a communication monitoring device, a primary communication from the primary communication session, wherein the primary communication is between a first communication device and a second communication device, and wherein the primary communication session is e-mail;
   receiving, by the communication monitoring device, a signal selecting the secondary communication session for future communications from the first communication device, wherein the secondary communication session is a community chat room that is devoted to a subject of the primary communication session, and wherein the secondary communication session has been determined to be a preferable venue for the future communications from the first communication device;
   data mining, by the communication monitoring device, content of the primary communication to identify the subject of the primary communication session;
   creating, by the communication monitoring device, the community chat room for the secondary communication session based on the subject of the primary communication session;
   directing, by the communication monitoring device, the future communications from the first communication device to the secondary communication session;
   determining, by the communication monitoring device, that a specific device from the primary communication session is already enrolled in an existing community chat room that is directed to the subject of the primary communication session, wherein the specific device is from a group of devices that include the first communication device and the second communication device; and
   responsive to the determining that the specific device is already enrolled in the existing community chat room, removing, by the communication monitoring device, the specific device from the created community chat room.

2. The method of claim 1, further comprising:
   receiving, by the communication monitoring device, a user input that identifies the community chat room.

3. The method of claim 1, wherein the primary communication session is a text-based communication session, and wherein the method further comprises:
   detecting, by a keystroke pattern detection hardware device, a keystroke pattern from a device used in the text-based communication session, wherein the device is from the group of devices that include the first communication device and the second communication device; and
   assigning, by the communication monitoring device and based on the keystroke pattern, the device used in the text-based communication session to a non-text-based communication session.

4. The method of claim 1, further comprising:
   receiving, by the communication monitoring device, a device type signal that identifies a type of device from the group of devices that include the first communication device and the second communication device; and
   utilizing, by the communication monitoring device, the device type signal to architect the secondary communication session.

5. The method of claim 1, further comprising:
   receiving, by the communication monitoring device, a sensor signal from a sensor on a device from the group of devices that include the first communication device and the second communication device, wherein the sensor signal describes a physical condition of the device; and
   utilizing, by the communication monitoring device, the sensor signal to architect the secondary communication session.

6. The method of claim 1, wherein the secondary communication session is the community chat room, and wherein the method further comprises:
   populating the created community chat room with other e-mails that are related to the primary communication session.

7. The method of claim 1, wherein the communication monitoring device populates the created community chat room with other e-mails that are related to the primary communication session.

8. A system comprising:
   a first communication device:
   a second communication device, wherein a primary communication session is established by a primary communication between the first communication device and the second communication device; and a communication monitoring device that monitors the first communication device and the second communication device, wherein the communication monitoring device:
  detects the primary communication from the primary communication session, wherein the primary communication session is e-mail;
  receives a signal selecting a secondary communication session for future communications from the first communication device, wherein the secondary communication session is a community chat room that is devoted to a subject of the primary communication session, and wherein the secondary communication session has been determined to be a preferable venue for the future communications from the first communication device;
  data mines content of the primary communication to identify the subject of the primary communication session;
  creates the community chat room for the secondary communication session based on the subject of the primary communication session:
  directs the future communications from the first communication device to the secondary communication session; and
  determines that a specific device from the primary communication session is already enrolled in an existing community chat room that is directed to the subject of the primary communication session, wherein the specific device is from a group of devices that include the first communication device and the second communication device, and wherein the communication monitoring device removes, in response to the determining that the specific device from the primary communication session is already enrolled in the existing community chat room, the specific device from the community chat room that was created in response to the secondary communication session.

9. The system of claim 8, wherein the primary communication session is a text-based communication session, and wherein the system further comprises:
  detecting, by a keystroke pattern detection hardware device, a keystroke pattern from the first communication device; and
  assigning, by the communication monitoring device and based on the keystroke pattern, the first communication device used in the text-based communication session to a non-text-based communication session.

10. The system of claim 8, further comprising:
  a device type generator on the first communication device, wherein the device type generator generates a device type signal that identifies a device type that describes the first communication device; and
  utilizing, by the communication monitoring device, the device type signal to architect the secondary communication session.

11. The system of claim 8, further comprising:
  a sensor on the first communication device, wherein the sensor generates a condition signal that describes a physical condition of the first communication device, and wherein the sensor transmits the condition signal to the communication monitoring device, and wherein the communication monitoring device utilizes the condition signal to architect the secondary communication session.

12. A computer program product for transitioning from a primary communication session to a secondary communication session, the computer program product comprising a computer readable storage medium having program code embodied therewith, wherein the computer readable storage medium is not a transitory signal per se, and wherein the program code is readable and executable by a processor to perform a method comprising:
  detecting a primary communication from the primary communication session, wherein the primary communication is between a first communication device and a second communication device, and wherein the primary communication session is e-mail;
  receiving a signal selecting the secondary communication session for future communications from the first communication device, wherein the secondary communication session is a community chat room that is devoted to a subject of the primary communication session, and wherein the secondary communication session has been determined to be a preferable venue for the future communications from the first communication device;
  data mining content of the primary communication to identify the subject of the primary communication session;
  creating the community chat room for the secondary communication session based on the subject of the primary communication session;
  directing the future communications from the first communication device to the secondary communication session;
  determining that a specific device from the primary communication session is already enrolled in an existing community chat room that is directed to the subject of the primary communication session, wherein the specific device is from a group of devices that include the first communication device and the second communication device; and
  responsive to the determining that the specific device is already enrolled in the existing community chat room, removing the specific device from the created community chat room that was generated in response to the secondary communication session.

13. The computer program product of claim 12, wherein the primary communication session is a text-based communication session, and wherein the method further comprises:
  detecting a keystroke pattern from a device used in the text-based communication session, wherein the device is from the group of devices that include the first communication device and the second communication device; and
  assigning, based on the keystroke pattern, the device used in the text-based communication session to a non-text-based communication session.

* * * * *